United States Patent [19]

Huang

[11] Patent Number: 5,447,323
[45] Date of Patent: Sep. 5, 1995

[54] POSITIONING ARRANGEMENT FOR A BACKREST OF A STROLLER

[76] Inventor: Li-Chu C. Huang, No. 9, Alley 2, Lane 606, Sec. 2, Po Ai Rd., Chia Yi City, Taiwan

[21] Appl. No.: 300,411
[22] Filed: Sep. 2, 1994
[51] Int. Cl.⁶ .............................................. B62B 7/06
[52] U.S. Cl. .................................... 280/642; 280/650; 280/648; 297/378.14
[58] Field of Search ................ 280/642, 647, 47.4, 280/648, 643, 650; 297/357, 353, 354.1, 354.13, 378.14, 366, 376, 378.12; 403/92, 93

[56] References Cited

U.S. PATENT DOCUMENTS

| | | | |
|---|---|---|---|
| 1,073,379 | 9/1913 | Williams | 280/648 |
| 3,116,069 | 12/1963 | Dostal | 280/648 |
| 4,529,219 | 7/1985 | Shamie | 280/642 |
| 4,632,421 | 12/1986 | Shamie | 280/642 |
| 4,832,361 | 5/1989 | Nakao et al. | 280/642 |
| 4,919,482 | 4/1990 | Landis et al. | 297/378.14 |
| 4,921,261 | 5/1990 | Sadler, Jr. et al. | 280/643 |
| 5,234,224 | 8/1993 | Kim | 280/648 |

Primary Examiner—Eric D. Culbreth
Assistant Examiner—Carla Mattix
Attorney, Agent, or Firm—Ross, Clapp, Korn & Montgomery

[57] ABSTRACT

A backrest positioning arrangement for a stroller includes a positioning plate securely mounted to each of two limbs of the backrest frame member of the stroller and has a pushing piece extending toward a front direction of the stroller and a flexible operative piece having a recess therein which faces the front direction of the stroller. The stroller has a pair of mounting seats for mounting the canopy frame member and the rear members thereof to the handle thereof. Each mounting seat has a peg thereon for releasably engaging with the recess of the associated flexible operative piece.

1 Claim, 5 Drawing Sheets

POSITIONING ARRANGEMENT FOR A BACKREST OF A STROLLER

BACKGROUND OF THE INVENTION

1. Field of the Invention

The present invention relates to a stroller and, more particularly, to a stroller with an improved arrangement for positioning a backrest thereof.

2. Description of Related Art

A variety of devices have heretofore provided to strollers to improve the utility thereof, such as devices for controlling rotational direction of wheels, detachable and adjustable armrests, devices for changing orientation of handles, devices for adjusting inclination angle of the backrest, and devices allowing folding of the stroller.

However, the assembly of conventional positioning devices for backrest frame members is troublesome and time-consuming due to the inefficient design thereof. Furthermore, the baby in the stroller risks being injured as the backrest frame member is not reliably retained in position.

Therefore, there has been a long and unfulfilled need for a stroller with an improved arrangement for positioning the backrest.

SUMMARY OF THE INVENTION

In accordance with one aspect of the invention, a backrest positioning arrangement for a stroller includes a positioning plate which is securely mounted to each of two limbs of the backrest frame member of the stroller and which has a pushing piece extending toward a front direction of the stroller and a flexible operative piece having a recess therein which faces the front direction of the stroller. The stroller has a pair of mounting seats for mounting the canopy frame member and the rear members thereof to the handle thereof. Each mounting seat has a peg thereon for releasably engaging with the recess of the associated flexible operative piece.

In accordance with another aspect of the invention, there is provided a stroller including a pair of front members, a handle with two first limbs respectively mounted to the front members, a mounting seat mounted to each of the first limbs of the handle and comprising a pair of spaced lugs, a recess in an upper end, and a peg extending therefrom, a connecting seat pivotally mounted to the recess of each of the mounting seats, a canopy supporting member mounted to the connecting seats to pivot therewith, a pair of rear members respectively and pivotally mounted to the spaced lugs of the mounting seats, a seat frame member pivotally mounted to the front and rear members, a backrest frame member with two second limbs pivotally mounted to the seat frame member, and a positioning plate securely mounted to each of the second limbs of the backrest frame member and comprising a pushing piece extending toward a front direction of the stroller and a flexible operative piece having a recess therein which faces the front direction of the stroller for releasably engaging with the peg on the associated mounting seat, the peg being disengaged from the recess when the flexible operative piece is pressed away from the peg.

Other objects, advantages, and novel features of the invention will become more apparent from the following detailed description when taken in conjunction with the accompanying drawings.

DESCRIPTION OF THE PREFERRED EMBODIMENT

Figure 6:
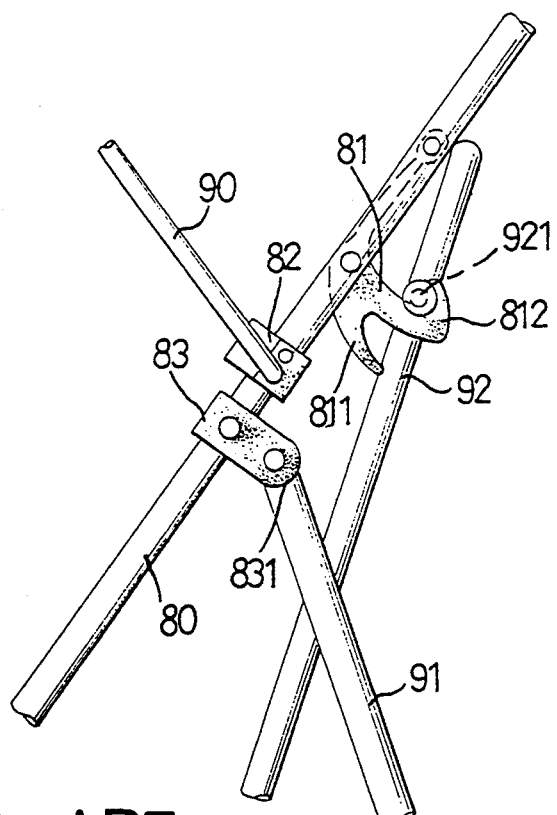
FIG. 6 is a schematic side view illustrating a conventional arrangement for positioning the backrest of a stroller.
Figure 7:
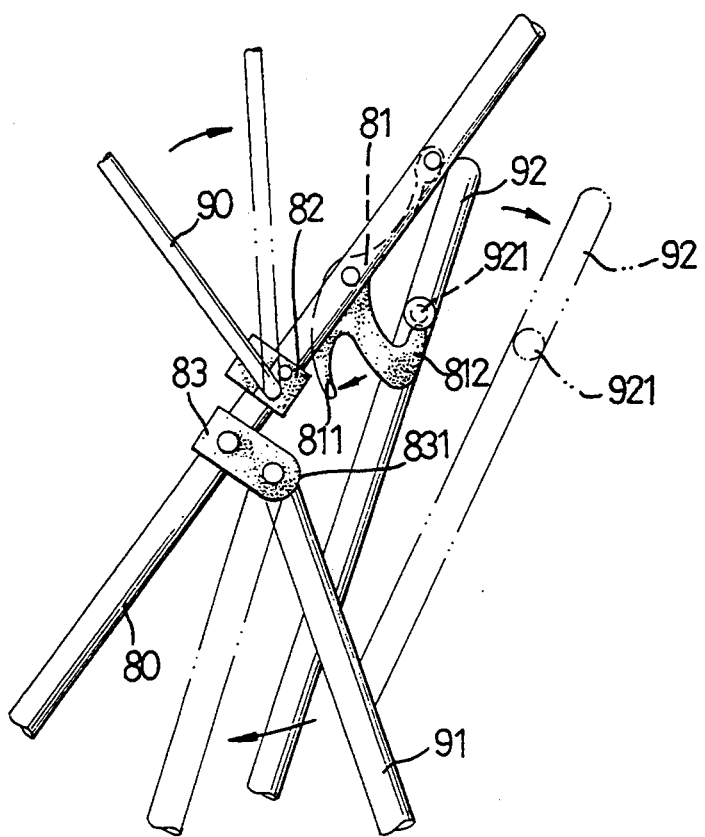
FIG. 7 is a schematic view illustrating adjustment of the backrest frame member in FIG. 6.

For a better understanding of the background of the invention, reference is firstly made to FIGS. 6 and 7 in which a typical conventional arrangement for positioning the backrest of a stroller is shown. As can be seen in FIG. 6, a conventional positioning plate is designated by reference numeral "81" and is mounted to each of two limbs of the handle 80 and includes a push piece 811 and a hook member 812 which locates above the push piece 811 and the open end of which faces a rearward direction of the stroller. A substantially U-shaped backrest frame member 92 includes a peg 921 on each of two limbs thereof for releasably engaging with the hook member 812 formed on each positioning plate 81 such that the backrest frame member 92 can be retained in either an almost upright position shown in FIG. 6 or be shifted to a less vertical position when the pegs 921 disengage with the hook members 812 (see the phantom lines in FIG. 7). Each limb of the handle 80 has a first mounting seat 82 riveted thereon for pivotally mounting a canopy supporting member 90. Below the first mounting seat 82, a substantially U-shaped second mounting seat 83 is mounted to each limb of the handle 80 and has an open end 831 to which a rear member 91 is pivotally mounted.

However, the above-described structure still has several drawbacks. Firstly, the backrest frame member 92 and the handle 80 have fabric mounted thereon, and when the backrest frame member 92 is moved from the substantially horizontal position to the almost upright position, the fabric is not pushed aside and, instead, is often stuck between the peg 921 and the hook members 812 and thus results in an unstable engagement therebetween which may injure the baby in the stroller. Secondly, each first mounting seat 82 includes springs and bearings therein, and each mounting seat 82, 83 requires several riveting steps in order to be mounted to the handle, all of which are troublesome and time-consuming in assembly and thus results in a high cost. Thirdly, although not affecting the function, the arrangement of the mounting seats 82 and 83 causes an unesthetic appearance.

Figure 1:
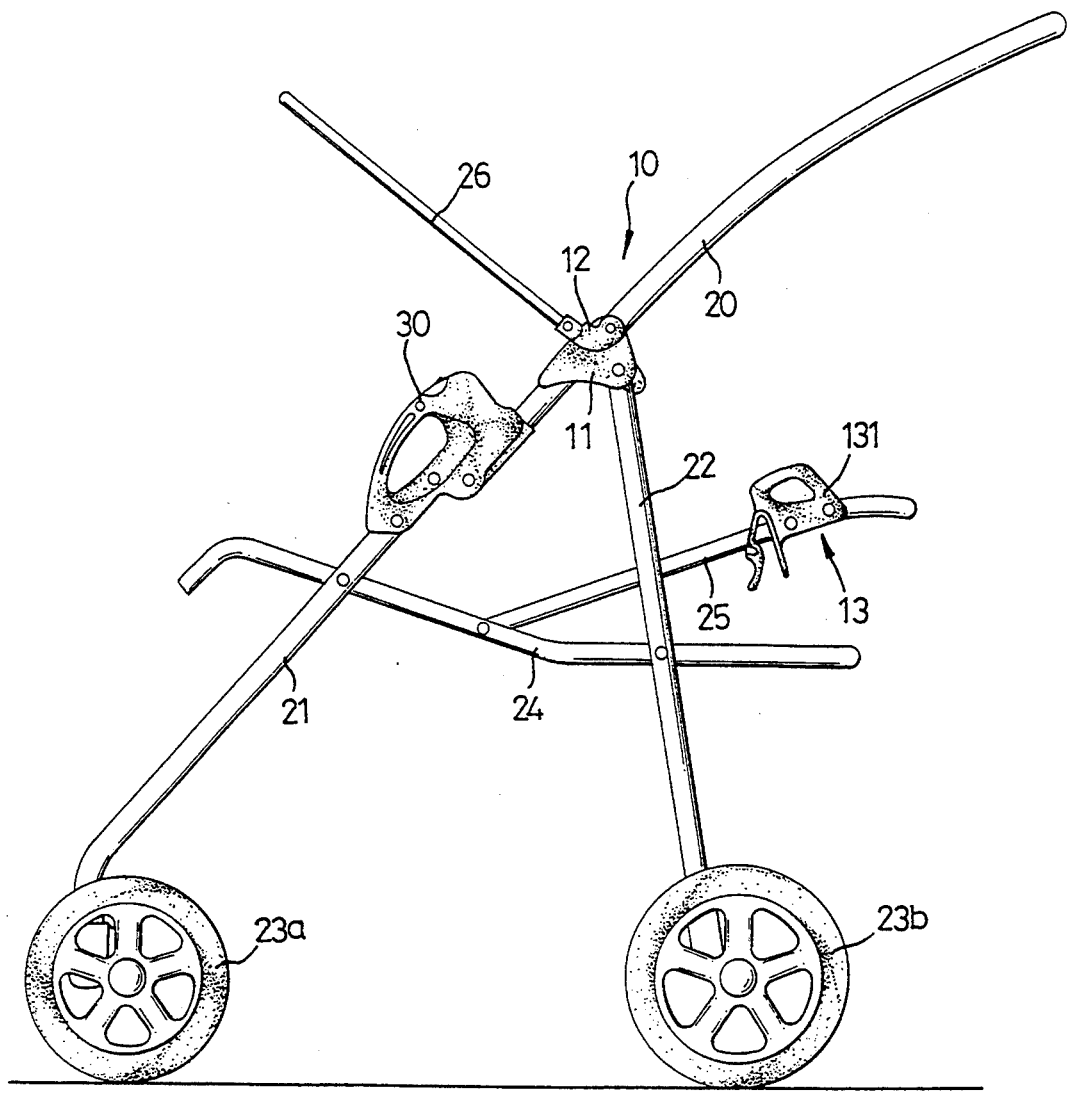
FIG. 1 is a schematic side elevational view of a stroller with a backrest positioning arrangement in accordance with the present invention.

Now referring to FIG. 1, a stroller generally includes a pair of front members 21 each having a lower end to which a front wheel 23a is mounted, a pair of rear members 22 each having a lower end to which a rear wheel 23b is mounted, a substantially U-shaped seat frame member 24 pivoted to the front and rear members 21 and 22, and a handle 20 having two limbs each of which is mounted to an associated front member 21 by a foldable seat 30 which is beyond the scope of the invention and therefore is not further described. A substantially U-shaped backrest frame member 25 has two distal lower ends thereof respectively mounted to two limbs of the U-shaped seat frame member 24.

Figure 2:
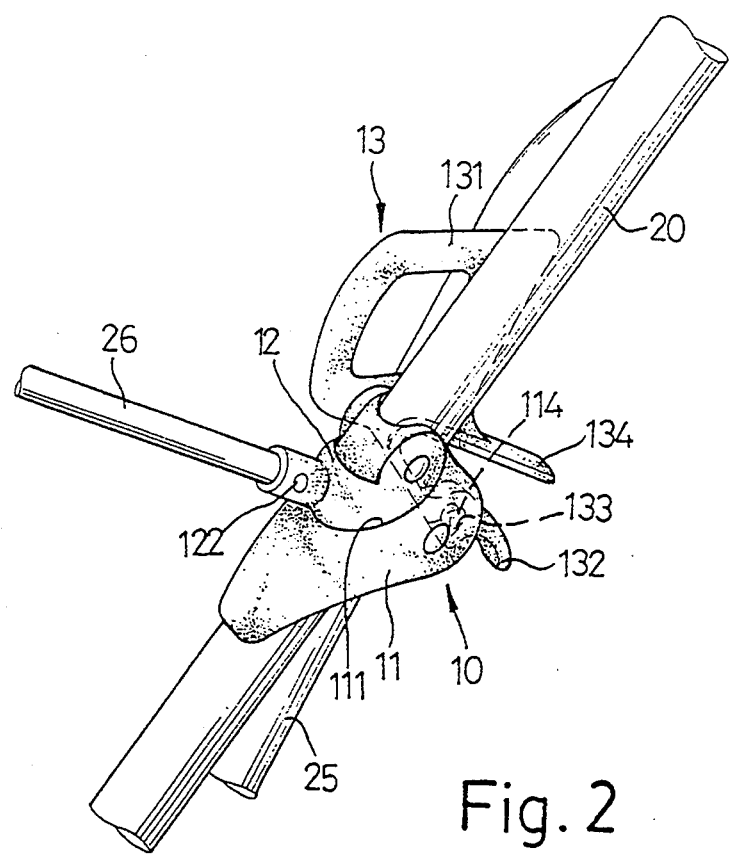
FIG. 2 is a partial perspective view illustrating the backrest positioning arrangement.
Figure 3:
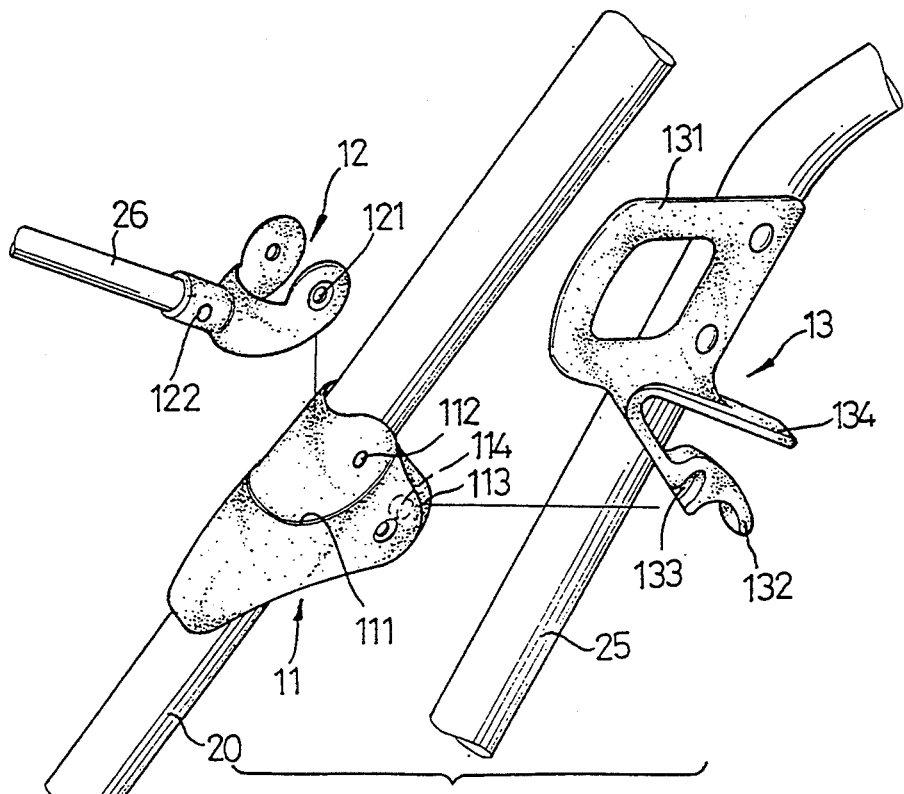
FIG. 3 is an exploded view of the arrangement in FIG. 2.

Still referring to FIG. 1 and further to FIGS. 2 and 3, a positioning plate 13 is securely mounted to each limb of the backrest frame member 25 and includes a pushing piece 131 extending toward a front direction of the stroller, a flexible operative piece 132 having a recess 133 therein which faces the front direction of the stroller, and a further piece 134. Operation of such a positioning plate 13 will be described hereinafter.

Still referring to FIGS. 1 through 3, a mounting seat 11 is mounted to a lower section of each limb of the handle 20 and includes an arcuate recess 111 (see FIG. 3) in an upper end thereof for pivotally engaging with a connecting seat 12 which has a sleeve 122 for receiving an end of a canopy supporting member 26. As can be seen in FIG. 3, the connecting seat 12 includes two spaced ears each having a hole 121, and the mounting seat 11 has two corresponding holes 112 in the recessed area so as to pivotally mount the connecting seat 12. The mounting seat 11 further has a pair of spaced lugs 113 each having a hole (not labeled) therein for pivotally connecting an upper end of the associated rear member 22. Furthermore, a peg 114 is formed on a surface of each mounting seat 11, preferably on the outer side of one of the lugs 113, for releasably engaging with the recess 133 of the associated positioning plate 13.

In assembly, each mounting seat 11 is firstly clamped to the lower section of the associated limb of the handle 20. The upper ends of rear members 22 are pivotally mounted between the lugs 113 of the associated mounting seats 11 by riveting. Thereafter, the connecting seats 12 are mounted to associated mounting seats 11 and both seats 11 and 12 are riveted in position by a single riveting procedure. Then, each positioning plate 13 is mounted to the associated limb of the backrest frame member 25 by two riveting procedures. The canopy frame member 26 is mounted to the connecting seats 12 to pivot therewith.

Figure 4:
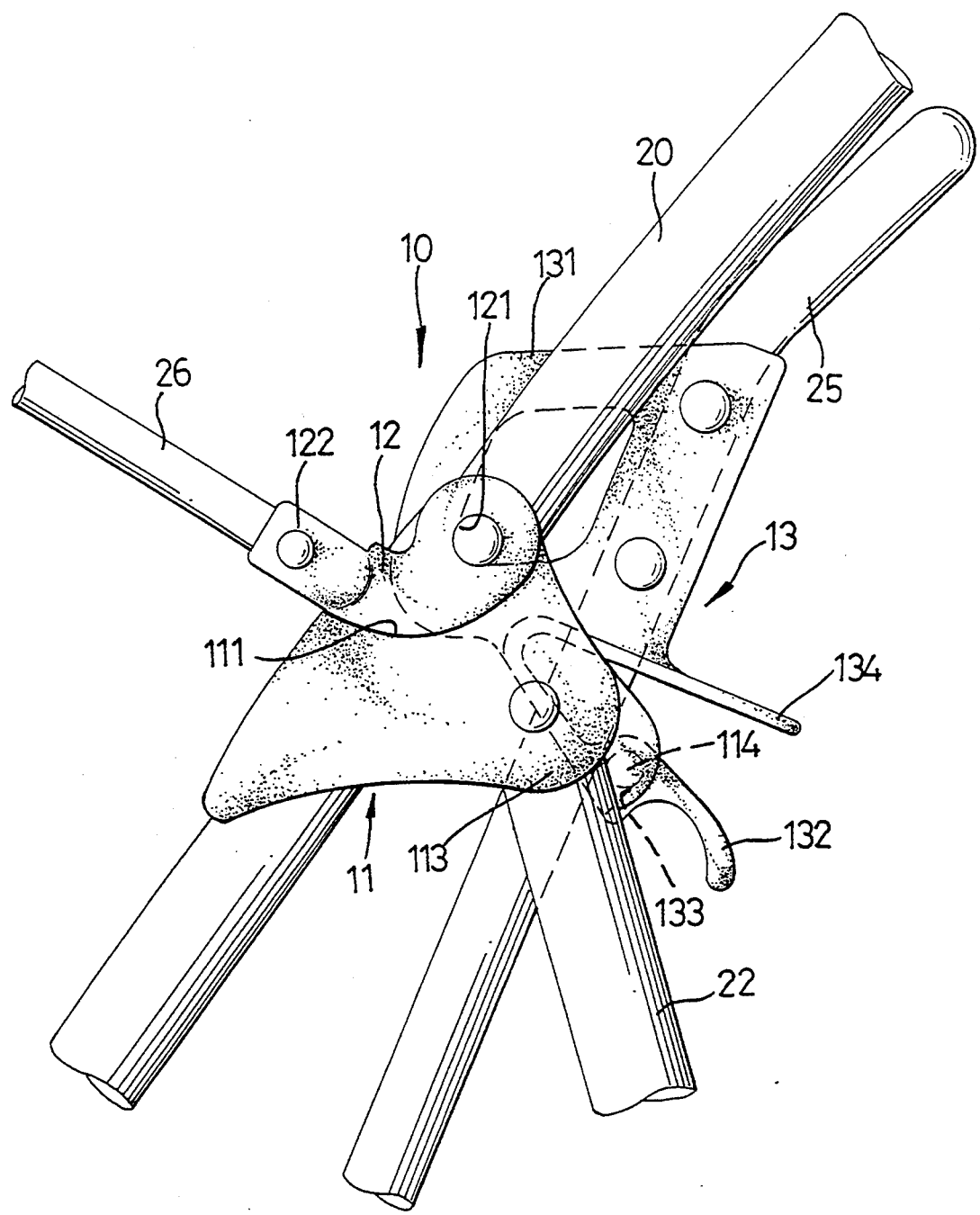
FIG. 4 is an enlarged partial side elevational view of the backrest positioning arrangement in which the backrest frame member is in an almost upright position.
Figure 5:
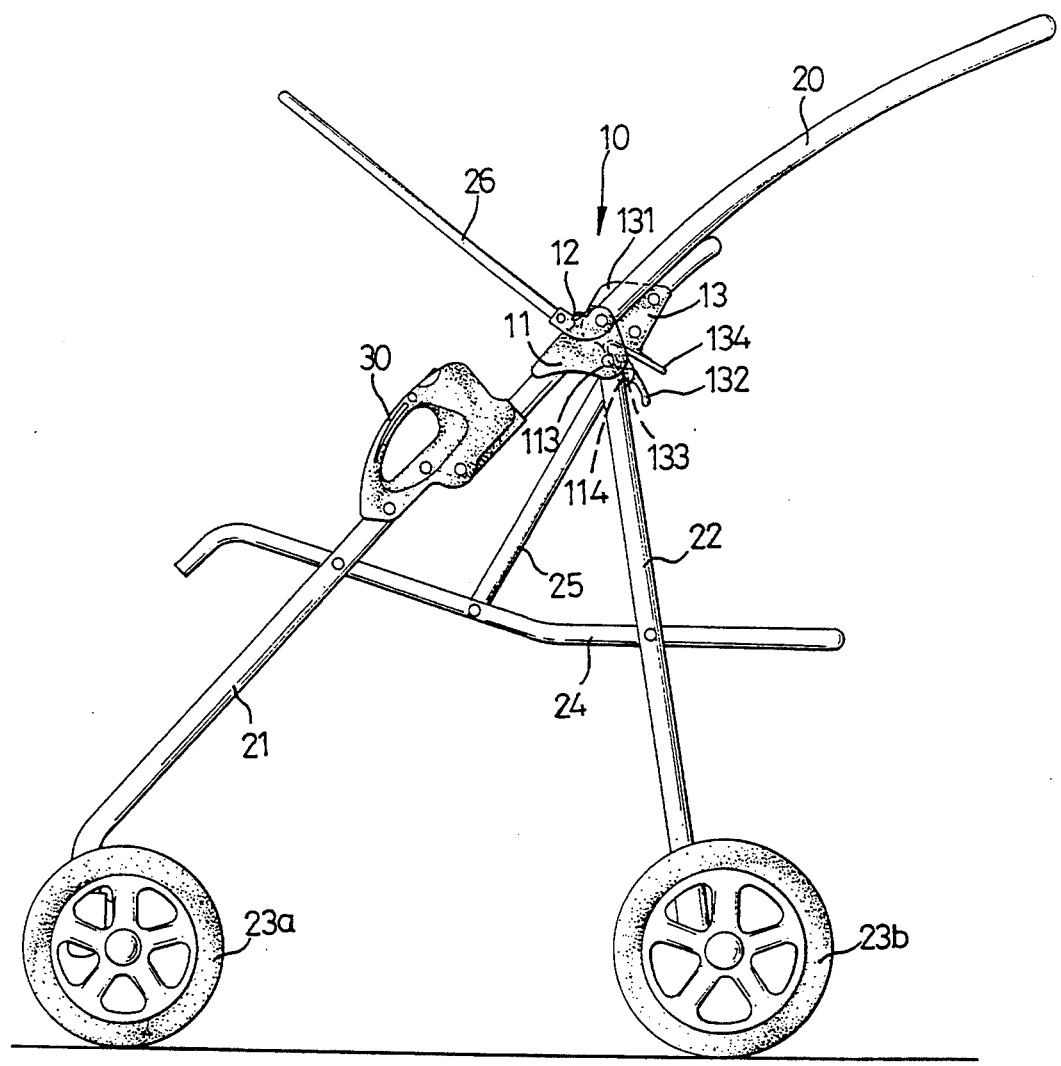
FIG. 5 is a schematic side view of the stroller in which the backrest frame member is in an almost upright position.

The backrest frame member 25 may be moved to an almost upright position shown in FIGS. 4 and 5 in which the pegs 114 engage with associated recesses 133 of the positioning plates 13. When changing the almost upright position to a substantially horizontal position, the user may press the flexible operative pieces 132 with his index fingers (and with his thumbs resting on a rear side of piece 134) to release the pegs 114 from the recesses 133, thereby allowing rearward movement of the backrest frame member 25 to the substantially horizontal position shown in FIG. 1.

Accordingly, it is appreciated that the drawbacks encountered by the prior art backrest positioning arrangement are mitigated and/or obviated under the provision of the invention.

Although the invention has been explained in relation to its preferred embodiment, it is to be understood that many other possible modifications and variations can be made without departing from the spirit and scope of the invention as hereinafter claimed.

I claim:

1. A stroller comprising:
   a pair of front members;
   a handle with two first limbs respectively mounted to the front members;
   a mounting seat mounted to each of the first limbs of the handle and comprising a pair of spaced lugs, a recess in an upper end, and a peg extending therefrom;
   a connecting seat pivotally mounted to the recess of each of the mounting seats;
   a canopy supporting member mounted to the connecting seats to pivot therewith;
   a pair of rear members respectively and pivotally mounted to the spaced lugs of the mounting seats;
   a seat frame member pivotally mounted to the front and rear members;
   a backrest frame member with two second limbs pivotally mounted to the seat frame member; and
   a positioning plate securely mounted to each of the second limbs of the backrest frame member and comprising a pushing piece extending toward a front direction of the stroller and a flexible operative piece having a recess therein which faces the front direction of the stroller for releasably engaging with the peg on the associated mounting seat, the peg being disengaged from the recess when pressing the flexible operative piece away from the peg.

* * * * *